(12) United States Patent
Chen et al.

(10) Patent No.: US 8,719,267 B2
(45) Date of Patent: May 6, 2014

(54) SPECTRAL NEIGHBORHOOD BLOCKING FOR ENTITY RESOLUTION

(75) Inventors: Aiyou Chen, New Providence, NJ (US); Liangcai Shu, Binghamton, NY (US); Ming Xiong, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 292 days.

(21) Appl. No.: 12/762,441

(22) Filed: Apr. 19, 2010

(65) Prior Publication Data

US 2011/0258190 A1 Oct. 20, 2011

(51) Int. Cl.
*G06F 17/30* (2006.01)

(52) U.S. Cl.
USPC .......................................... 707/737; 707/797

(58) Field of Classification Search
CPC ................... G06F 17/30327; G06F 17/30436
USPC ............................................... 707/737, 797
See application file for complete search history.

(56) References Cited

U.S. PATENT DOCUMENTS

| 5,799,299 | A  | * | 8/1998 | Fujiwara ............................... 1/1 |
|---|---|---|---|---|
| 2004/0162834 | A1 | * | 8/2004 | Aono et al. .................... 707/100 |
| 2004/0186846 | A1 | * | 9/2004 | Birdwell et al. .............. 707/101 |
| 2005/0254439 | A1 | * | 11/2005 | Fleck et al. .................... 370/256 |
| 2006/0020662 | A1 | * | 1/2006 | Robinson ...................... 709/203 |
| 2006/0132826 | A1 | * | 6/2006 | Ciriza et al. .................. 358/1.15 |
| 2008/0215845 | A1 | * | 9/2008 | Allen et al. .................... 711/170 |
| 2009/0006378 | A1 | * | 1/2009 | Houle ................................ 707/5 |
| 2009/0030864 | A1 | * | 1/2009 | Pednault et al. ................ 706/45 |
| 2009/0055361 | A1 | * | 2/2009 | Birdwell et al. ................... 707/3 |
| 2009/0198678 | A1 | * | 8/2009 | Conrad et al. ..................... 707/5 |
| 2010/0169311 | A1 | * | 7/2010 | Tengli et al. ................... 707/736 |

OTHER PUBLICATIONS

Barber, Michael J., "Modularity and community detection in bipartite networks", Phys. Rev. E, vol. 76, Issue 6, pp. 066102-1-066102-9, Dec. 2007, American Physical Society.*

Bin Gao; Tie-Yan Liu; Guang Feng; Tao Qin; Qian-Sheng Cheng; Wei-Ying Ma; , "Hierarchical taxonomy preparation for text categorization using consistent bipartite spectral graph copartitioning," Knowledge and Data Engineering, IEEE Transactions on , vol. 17, No. 9, pp. 1263-1273, Sep. 2005.*

Dhillon, Inderjit S., "Co-clustering documents and words using bipartite spectral graph partitioning", KDD '01 Proceedings of the seventh ACM SIGKDD international conference on Knowledge discovery and data mining, pp. 269-274, ACM New York, NY, USA © 2001.*

(Continued)

*Primary Examiner* — Rehana Perveen
*Assistant Examiner* — Mark E Hershley
(74) *Attorney, Agent, or Firm* — Ryan, Mason & Lewis, LLP

(57) ABSTRACT

A processing device of an information processing system is operative to obtain a plurality of records, documents, web pages or other data objects, and to construct a binary tree using a bipartition procedure in which subsets of the data objects are associated with respective nodes of the tree. Evaluation of a designated modularity for a given one of the nodes of the tree is used as a stopping criterion to prevent further partitioning of that node and to indicate designation of that node as a leaf node of the tree. The resulting leaf nodes of the tree provide a non-overlapping partitioning of the plurality of data objects. The processing device is further operative to perform a neighborhood search on the tree to identify pairs of the plurality of data objects that match the same entity, and to store an indication of the matching pairs of data objects.

18 Claims, 4 Drawing Sheets

(56) References Cited

OTHER PUBLICATIONS

Dong-Qing Zhang; Ching-Yung Lin; Shi-Fu Chang; Smith, J.R.; , "Semantic video clustering across sources using bipartite spectral clustering," Multimedia and Expo, 2004. ICME '04. 2004 IEEE International Conference on , vol. 1, no., pp. 117-120 vol. 1, Jun. 27-30, 2004.*
Golub et al, Gene H., "A Block Lanczos Method for Computing the Singular Values and Corresponding Singular Vectors of a Matrix", ACM Transactions on Mathematical Software (TOMS), vol. 7 Issue 2, Jun. 1981, pp. 149-169, ACM New York, NY, USA.*
Peter J. Bickel and Aiyou Chen, "A nonparametric view of network models and Newman-Girvan and other modularities", PNAS 2009 106 (50), pp. 21068-21073, published ahead of print Nov. 23, 2009.*
J. Shi et al., "Normalized Cuts and Image Segmentation," IEEE Transactions on Pattern Analysis and Machine Intelligence, Aug. 2000, pp. 888-905, vol. 22, No. 8.
G. Salton et al., "A Vector Space Model for Automatic Indexing," Communications of the ACM, Nov. 1975, pp. 613-620, vol. 18, No. 11.
Charu C. Aggarwal, "On the Effects of Dimensionality Reduction on High Dimensional Similarity Search," 20th ACM SIGMOD-SIGACT-SIGART Symposium on Principles of Database Systems, May 2001, pp. 256-266.
R. Baxter et al., "A Comparison of Fast Blocking Methods for Record Linkage," 9th ACM SIGKDD Workshop on Data Cleaning, Record Linkage and Object Consolidation, Aug. 2003, 6 pages.
Michael W. Berry, "Large Scale Sparse Singular Value Computations," International Journal of Supercomputer Applications, Jan. 1992, pp. 13-49, vol. 6, No. 1.
I. Bhattacharya et al., "Deduplication and Group Detection Using Links," 10th ACM SIGKDD Workshop on Link Analysis and Group Detection, Aug. 2004, 10 pages.
I. Bhattacharya et al., "Iterative Record Linkage for Cleaning and Integration," 9th ACM SIGMOD Workshop on Research Issues in Data Mining and Knowledge Discovery, Jun. 2004, pp. 11-18.
I. Bhattacharya et al., "A Latent Dirichlet Model for Unsupervised Entity Resolution," 6th SIAM International Conference on Data Mining, Apr. 2006, pp. 47-58.
P.J. Bickel et al., "A Nonparametric View of Network Models and Newman-Girvan and Other Modularities," Procedures of the National Academy of Sciences, Dec. 2009, pp. 21068-21073, vol. 106, No. 50.
M. Bilenko et al., "Adaptive Duplicate Detection Using Learnable String Similarity Measures," 9th ACM SIGKDD International Conference on Knowledge Discovery and Data Mining, Aug. 2003, pp. 39-48.
P. Christen et al., "Febrl—Freely Extensible Biomedical Record Linkage," Release 0.3, Apr. 2005, 177 pages.
W.W. Cohen et al., "Learning to Match and Cluster Large High-Dimensional Data Sets for Data Integration," 8th ACM SIGKDD International Conference on Knowledge Discovery and Data Mining, Jul. 2002, pp. 475-480.
S. Deerwester et al., "Indexing by Latent Semantic Analysis," Journal of the American Society for Information Science, 1990, pp. 391-407, vol. 41, No. 6.
A.K. Elmagarmid et al., "Duplicate Record Detection: A Survey," IEEE Transactions on Knowledge and Data Engineering, Jan. 2007, pp. 1-16, vol. 19, No. 1.
S.E. Whang et al., "Entity Resolution with Iterative Blocking," ACM SIGMOD, Jun.-Jul. 2009, 13 pages.
W. Fan et al., "Reasoning About Record Matching Rules," 35th International Conference on Very Large Data Bases, Aug. 2009, pp. 407-418, vol. 2, No. 1.
I.P. Fellegi et al., "A Theory for Record Linkage," Journal of the American Statistical Association, Dec. 1969, pp. 1183-1210, vol. 64, No. 328.
L. Gravano et al., "Text Joins in an RDBMS for Web Data Integration," 12th International Conference on World Wide Web, May 2003, pp. 90-101.
S. Guha et al., "Merging the Results of Approximate Match Operations," 30th International Conference on Very Large Data Bases, Aug.-Sep. 2004, pp. 636-647, vol. 30.
O. Hassanzadeh et al., "Framework for Evaluating Clustering Algorithms in Duplicate Detection," 35th International Conference on Very Large Data Bases, Aug. 2009, pp. 1282-1293, vol. 2, No. 1.
M.A. Hernández et al., "Real-World Data is Dirty: Data Cleansing and the Merge/Purge Problem," Data Mining and Knowledge Discovery, Jan. 1998, pp. 9-37, vol. 2, No. 1.
V.I. Levenshtein, "Binary Codes Capable of Correcting Deletions, Insertions, and Reversals," Soviet Physics-Doklady, Cybernetics and Control Theory, Feb. 1966, pp. 707-710, vol. 10, No. 8.
C.D. Manning et al., "Introduction to Information Retrieval," May 2008, 504 pages.
A. McCallum et al., "Efficient Clustering of High-Dimensional Data Sets with Application to Reference Matching," 6th ACM SIGKDD International Conference on Knowledge Discovery and Data Mining, 2000, pp. 169-178.
H.B. Newcombe et al., "Automatic Linkage of Vital Records: Computers can be Used to Extract 'Follow-up' Statistics of Families from Files of Routine Records," Science, Oct. 1959, pp. 954-959, vol. 130, No. 3381.
M.E.J. Newman et al., "Finding and Evaluating Community Structure in Networks," American Physical Society, Physical Review E, Feb. 2004, pp. 1-15, vol. 69, No. 2.
H. Pasula et al., "Identity Uncertainty and Citation Matching," Advances in Neural Information Processing Systems, Dec. 2002, pp. 1401-1408.
J.C. Pinheiro et al., "Methods for Linking and Mining Massive Heterogeneous Databases," 4th International Conference in Knowledge Discovery and Data Mining, Aug. 1998, pp. 309-313.
S. Sarawagi et al., "Interactive Deduplication Using Active Learning," 8th ACM SIGKDD International Conference on Knowledge Discovery and Data Mining, Jul. 2002, pp. 269-278.
L. Shu et al., "A Latent Topic Model for Complete Entity Resolution," IEEE International Conference on Data Engineering, Mar. 2009, pp. 880-891.
Esko Ukkonen, "Approximate String-Matching with q-Grams and Maximal Matches," Theoretical Computer Science, Jan. 1992, pp. 191-211, vol. 92, No. 1.
V.S. Verykios et al., "Automating the Approximate Record Matching Process," Information Sciences—Informatics and Computer Science: An International Journal, Jul. 2000, pp. 83-98, vol. 126, No. 1-4.
U. Von Luxburg et al., "Consistency of Spectral Clustering," The Annals of Statistics, Apr. 2008, pp. 555-586, vol. 36, No. 2.
Y.R. Wang et al., "The Inter-Database Instance Identification Problem in Integrating Autonomous Systems," 5th International Conference on Data Engineering, Feb. 1989, pp. 46-55.
William E. Winkler, "The State of Record Linkage and Current Research Problems," U.S. Bureau of the Census, Statistical Research Division, May 1999, 15 pages.
William E. Winkler, "Overview of Record Linkage and Current Research Directions," U.S. Bureau of the Census, Research Report Series (Statistics #2006-2), Feb. 2006, 44 pages.
D. Yan et al., "Fast Approximate Spectral Clustering," 15th ACM SIGKDD International Conference on Knowledge Discovery and Data Mining, Jun.-Jul. 2009, pp. 907-916.

* cited by examiner

FIG. 4A

| RECORD # | ADDRESS |
|---|---|
| 1 | 600 MOUNTAIN AVENUE |
| 2 | 700 MOUNTAIN AVE |
| 3 | 600-700 MOUNTAIN AVE |
| 4 | 100 DIAMOND HILL RD |
| 5 | 100 DIAMOND HILL ROAD |
| 6 | 123 SPRINGFIELD AVENUE |
| 7 | 123 SPRINFGIELD AVE |

FIG. 4B

|   | 1 | 2 | 3 | 4 | 5 | 6 | 7 |
|---|---|---|---|---|---|---|---|
| 1 | 1 | 0.423 | 0.56 | 0.004 | 0.004 | 0.24 | 0.013 |
| 2 | 0.423 | 1 | 0.466 | 0.005 | 0.004 | 0.013 | 0.043 |
| 3 | 0.56 | 0.466 | 1 | 0.004 | 0.003 | 0.01 | 0.035 |
| 4 | 0.004 | 0.005 | 0.004 | 1 | 0.71 | 0.008 | 0.009 |
| 5 | 0.004 | 0.004 | 0.003 | 0.71 | 1 | 0.008 | 0.008 |
| 6 | 0.24 | 0.013 | 0.01 | 0.008 | 0.008 | 1 | 0.513 |
| 7 | 0.013 | 0.043 | 0.035 | 0.009 | 0.008 | 0.513 | 1 |

SPECTRAL NEIGHBORHOOD BLOCKING FOR ENTITY RESOLUTION

FIELD OF THE INVENTION

The present invention relates generally to the field of information processing, and more particularly relates to techniques for identifying relationships between data objects in an information processing system.

BACKGROUND OF THE INVENTION

Entity resolution in the information processing field typically refers to determining whether multiple records, documents, web pages or other data objects represent the same real-world entity. The data objects may be from the same source or from different sources. Examples of entity resolution processes include record matching, record linkage or deduplication. The need for entity resolution often arises in information integration applications where data objects representing the same real-world entity are presented in different ways and there is a lack of a unique identifier for the real-world entity. As a more specific example, a telecommunications equipment supplier may be referred to as "Alcatel-Lucent," "Alcatel Lucent" and "Lucent" in different records, web pages or other data objects even though these data objects all represent the same company.

A number of entity resolution approaches are known. One possible approach is to perform pairwise comparison of all data objects. However, this simple approach is inefficient, in that it requires $O(n^2)$ comparisons for a data set of n objects, and is therefore not scalable for use with very large data sets. Other approaches utilize a technique known as "blocking" in order to provide improved efficiency. Blocking eliminates the need for pairwise comparison of all data objects by assigning the data objects to blocks such that data objects from different blocks are not considered as possible matches, i.e., cannot refer to the same entity. Therefore, pairwise comparisons are only necessary for pairs of objects within the same block in order to identify whether or not they represent the same entity.

Examples of conventional blocking techniques include sorted neighborhood, bigram indexing and canopy clustering. Sorted neighborhood is one of the most efficient of the conventional blocking techniques, with a computational complexity of $O(n \log n)$. Unfortunately, it fails to capture the pairwise similarities between data objects if two similar strings start with different characters, e.g., "Alcatel-Lucent" and "Lucent-Alcatel." On the other hand, bigram indexing and canopy clustering capture pairwise similarities better than sorted neighborhood, but they are less efficient because both have computational complexities of $O(n^2)$. Thus they do not scale well with large data sets.

SUMMARY OF THE INVENTION

Illustrative embodiments of the present invention provide improved entity resolution processes based on a technique referred to herein as spectral neighborhood blocking.

In accordance with one aspect of the invention, a processing device of an information processing system is operative to obtain a plurality of records, documents, web pages or other data objects, and to construct a binary tree using a bipartition procedure in which subsets of the data objects are associated with respective nodes of the tree. Evaluation of a designated modularity for a given one of the nodes of the tree is used as a stopping criterion to prevent further partitioning of that node and to indicate designation of that node as a leaf node of the tree. The designated modularity for the given node may comprise, for example, a Newman-Girvan modularity. The resulting leaf nodes of the tree provide a non-overlapping partitioning of the plurality of data objects. The processing device is further operative to perform a neighborhood search on the tree to identify pairs of the plurality of data objects that match the same entity, and to store an indication of the matching pairs of data objects.

In one or more of the illustrative embodiments, the bipartition procedure may comprise computing a designated singular vector of a matrix C as $C=D^{-1/2}B$, where B denotes an n×m normalized record-qgram matrix having a corresponding record-record similarity matrix given by $A=BB^T$, where $D=\text{diag}(B(B^T 1))$, and where diag(•) transforms a vector into a diagonal matrix, and further wherein the singular vector of C corresponds to a designated eigenvector of Laplacian matrix $\mathcal{L}(A)$, such that the bipartition procedure is performed without requiring computation of the record-record similarity matrix A. The singular vector may more specifically comprise a second maximum singular vector of the matrix C that corresponds to a second smallest eigenvector of the Laplacian matrix $\mathcal{L}(A)$. The bipartition procedure may assign the records associated with the given one of the nodes to one of two subsets according to signs of corresponding entries in the singular vector.

The illustrative embodiments provide significant advantages over conventional approaches. For example, as indicated above, the spectral neighborhood blocking in one or more of these embodiments is implemented without requiring direct computation of a record-record similarity matrix. It exhibits an average computational complexity of $O(n \log n)$, such that it scales well with large data sets. It also overcomes the above-noted disadvantage of sorted neighborhood blocking in terms of the failure of that approach to capture pairwise similarities between data objects under certain conditions.

These and other features and advantages of the present invention will become more apparent from the accompanying drawings and the following detailed description.

BRIEF DESCRIPTION OF THE DRAWINGS

FIGS. 4A, 4B and 4C illustrate a set of records, a similarity matrix and a bipartition tree, respectively, in an example of the entity resolution process of FIG. 3.

DETAILED DESCRIPTION OF THE INVENTION

The present invention will be illustrated herein in conjunction with exemplary information processing systems, processing devices and entity resolution techniques. It should be understood, however, that the invention is not limited to use with the particular types of systems, devices and techniques disclosed. For example, aspects of the present invention can be implemented in a wide variety of other information processing system configurations, using processing devices and process steps other than those described in conjunction with the illustrative embodiments.

Figure 1:
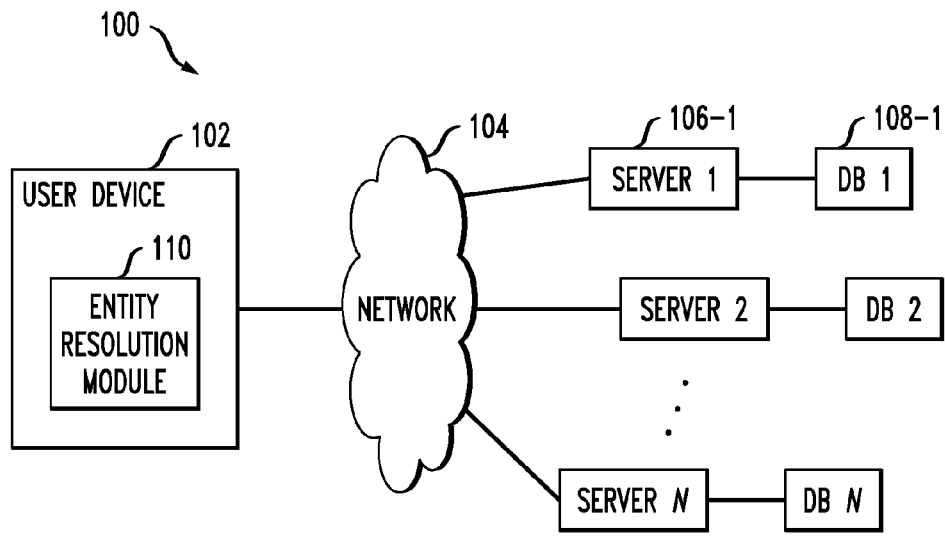
FIG. 1 is a block diagram of an information processing system implementing spectral neighborhood blocking for entity resolution in an illustrative embodiment of the invention.

FIG. 1 shows an information processing system 100 comprising a user device 102 coupled via a network 104 to a plurality of servers 106-1, 106-2, . . . 106-N, also denoted Server 1, Server 2, . . . Server N. Each of the servers 106 has an associated database 108. These databases store records or other data objects that are accessed by the user device 102 via the network 104. The user device 102 in this embodiment comprises an entity resolution module 110 that is configured to implement entity resolution based on a spectral neighborhood blocking technique to be described in greater detail below. The entity resolution module 110 utilizes this technique to accurately and efficiently determine which of multiple records or other data objects accessed by the user device 102 correspond to the same entity. The system 100 is configured to store an indication of such matching data objects in an associated memory, such as a memory of the user device 102 or a memory of one or more of the servers 106 or databases 108, in order to facilitate storage and processing of data objects. The system may therefore comprise, for example, a data storage system, a search system, or other type of system in which it is beneficial to identify relationships between data objects.

The user device 102 may comprise at least a portion of a computer or any other type of processing device suitable for communicating over network 104. For example, the user device may comprise a portable or laptop computer, mobile telephone, personal digital assistant (PDA), wireless email device, television set-top box (STB), or other communication device.

The network 104 may comprise a wide area network such as the Internet, a metropolitan area network, a local area network, a cable network, a telephone network, a satellite network, as well as portions or combinations of these or other networks.

In other embodiments, the entity resolution module 110 may be implemented in one or more of the servers 106 or their associated databases 108, or in a separate centralized controller coupled to one or more of these elements. It is also possible to implement the entity resolution module in a distributed manner with portions of the module being arranged in respective ones of the devices 102, 106 or 108 or subsets thereof.

Figure 2:
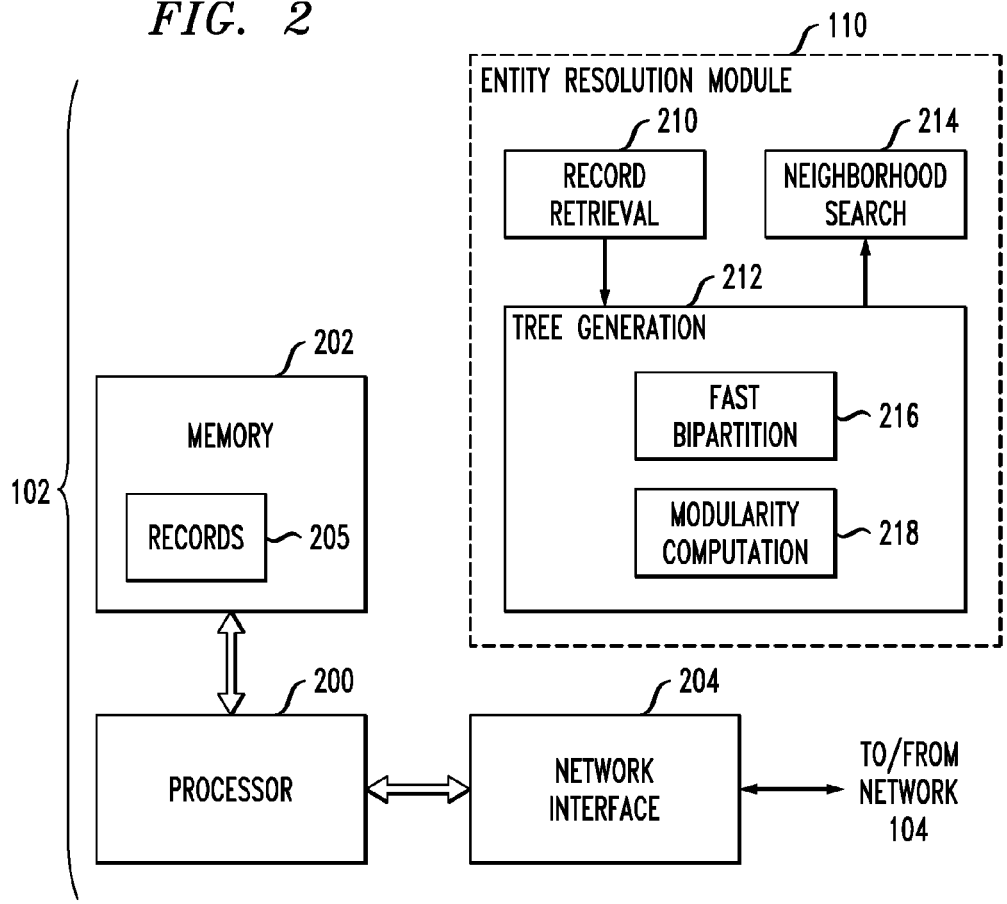
FIG. 2 shows a more detailed view of a processing device of the FIG. 1 system.

Referring now to FIG. 2, one possible implementation of the user device 102 of the system 100 is shown. In this embodiment, the user device comprises a processor 200 coupled to a memory 202, and further comprises network interface circuitry 204. The memory 202 is assumed to store records 205 which are retrieved over the network 104. Also included in the user device 102 is the entity resolution module 110 which in this implementation comprises a record retrieval module 210, a tree generation module 212 and a neighborhood search module 214. The tree generation module 212 comprises a fast bipartition element 216 and a modularity computation element 218.

The processor 200 may be implemented as a microprocessor, a microcontroller, an application-specific integrated circuit (ASIC) or other type of processing device, as well as portions or combinations of such devices. The memory 202 may comprise an electronic random access memory (RAM), a read-only memory (ROM), a disk-based memory, or other type of storage device, as well as portions or combinations of such devices. The processor and memory may be used in storage and execution of one or more software programs for entity resolution based on spectral neighborhood blocking, as well as for performing related operations, such as those associated with storage and processing of retrieved records. The modules 210, 214 and 216 may therefore be implemented at least in part using such software programs. The memory 202 may be viewed as an example of what is more generally referred to herein as a computer program product or still more generally as a computer-readable storage medium that has executable program code embodied therein. Other examples of computer-readable storage media may include disks or other types of magnetic or optical media, in any combination.

The processor 200, memory 202 and interface circuitry 204 may comprise well-known conventional circuitry suitably modified to operate in the manner described herein. Also, the various modules shown in FIG. 2 may be viewed as examples of circuitry used to implement the associated functionality. For example, portions of such circuitry may comprise matrix multiplication circuitry or other types of arithmetic logic circuitry. Conventional aspects of such circuitry are well known to those skilled in the art and therefore will not be described in detail herein.

It is to be appreciated that an information processing system and associated user device as disclosed herein may be implemented using components and modules other than those specifically shown in the exemplary arrangements of FIGS. 1 and 2.

The operation of the system 100 in illustrative embodiments will now be described with reference to FIGS. 3 and 4.

Figure 3:
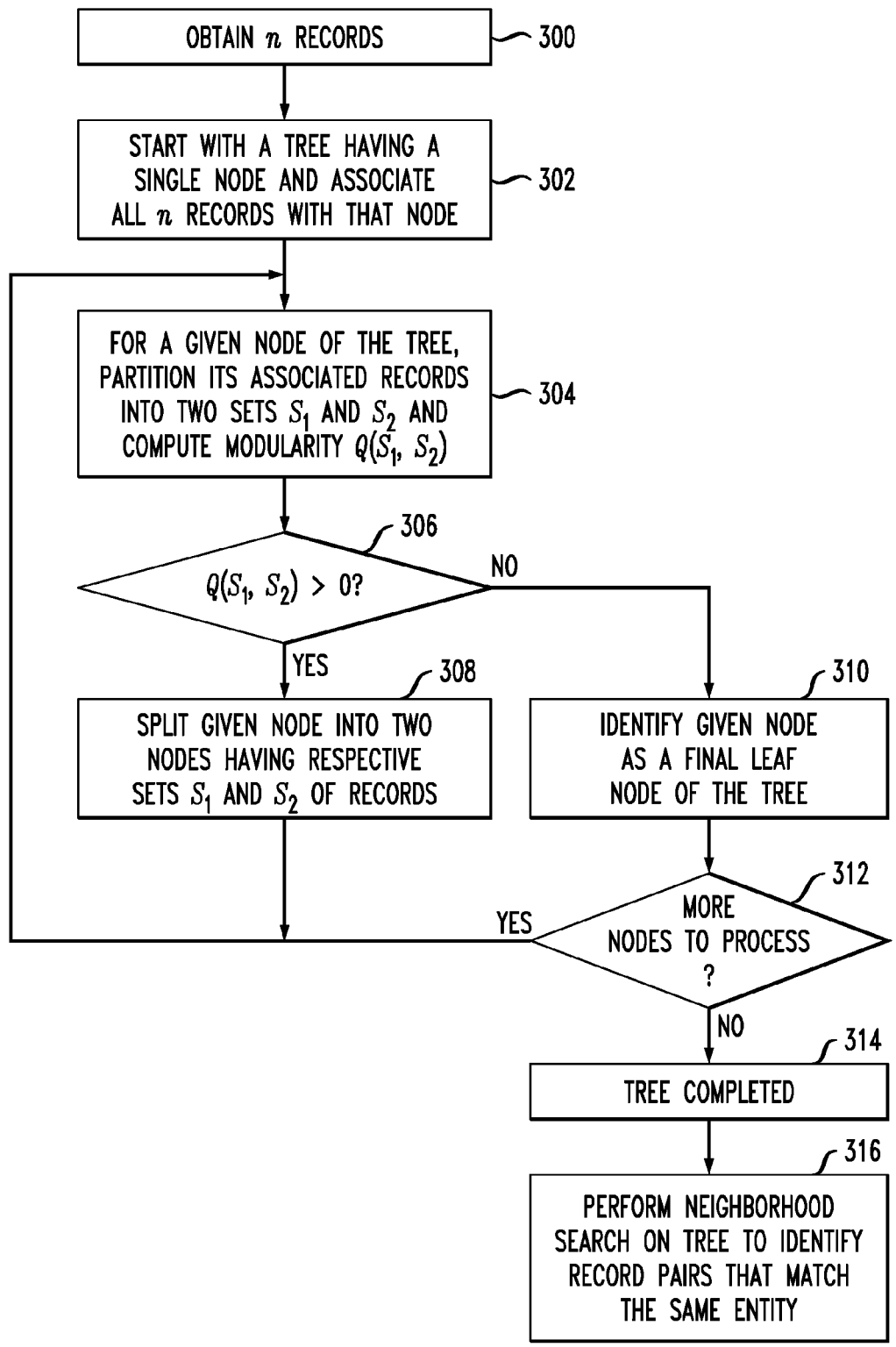
FIG. 3 is a flow diagram of an entity resolution process using spectral neighborhood blocking in an illustrative embodiment of the invention.

FIG. 3 is a flow diagram of an entity resolution process using spectral neighborhood blocking that is implemented in the system 100 of FIG. 1. The entity resolution process in this embodiment generally involves constructing a binary tree using a fast-bipartition procedure in which a Newman-Girvan modularity is used as a stopping criterion, such that resulting leaf nodes of the tree give a non-overlapping partition of n records, and then performing a neighborhood search on the tree to identify record pairs that match the same entity. The process includes steps 300 through 316 as shown.

In step 300, n records are obtained. These records may be obtained from one or more of the servers 106 via the network 104, from internal records storage 205, or from other sources, in any combination.

In step 302, the tree generation portion of the process begins with a tree having a single node, and all n of the records are associated with that node. The tree is then grown by recursive splitting of nodes using steps 304 through 312.

In step 304, for a given node of the tree, its associated records are partitioned into two separate sets. Assume the single node referred to in step 302 includes a set S of records, where $S \subset \{1, \ldots, n\}$. This set is partitioned in step 304 into two sets $S_1$ and $S_2$, and a Newman-Girvan modularity $Q(S_1, S_2)$ is computed. The Newman-Girvan modularity computation will be described in greater detail below.

In step 306, a determination is made as to whether or not the computed Newman-Girvan modularity $Q(S_1, S_2)$ is greater than zero. If $Q(S_1, S_2) > 0$, the given node is split into two nodes having respective sets $S_1$ and $S_2$ of records, as indicated in step 308, and the process returns to step 304 to consider splitting additional nodes of the tree. Otherwise, the given node is not split and is instead identified as a final leaf node of the tree, as indicated in step 310. The flow then moves to step 312 to determine if there are more nodes to be considered for splitting. If there are no additional nodes to be considered, the tree is completed as indicated in step 314. Otherwise, the flow returns to step 304 to process additional nodes.

In step 316, a neighborhood search is performed on the completed tree in order to identify record pairs that match the same entity.

Figure 4C:
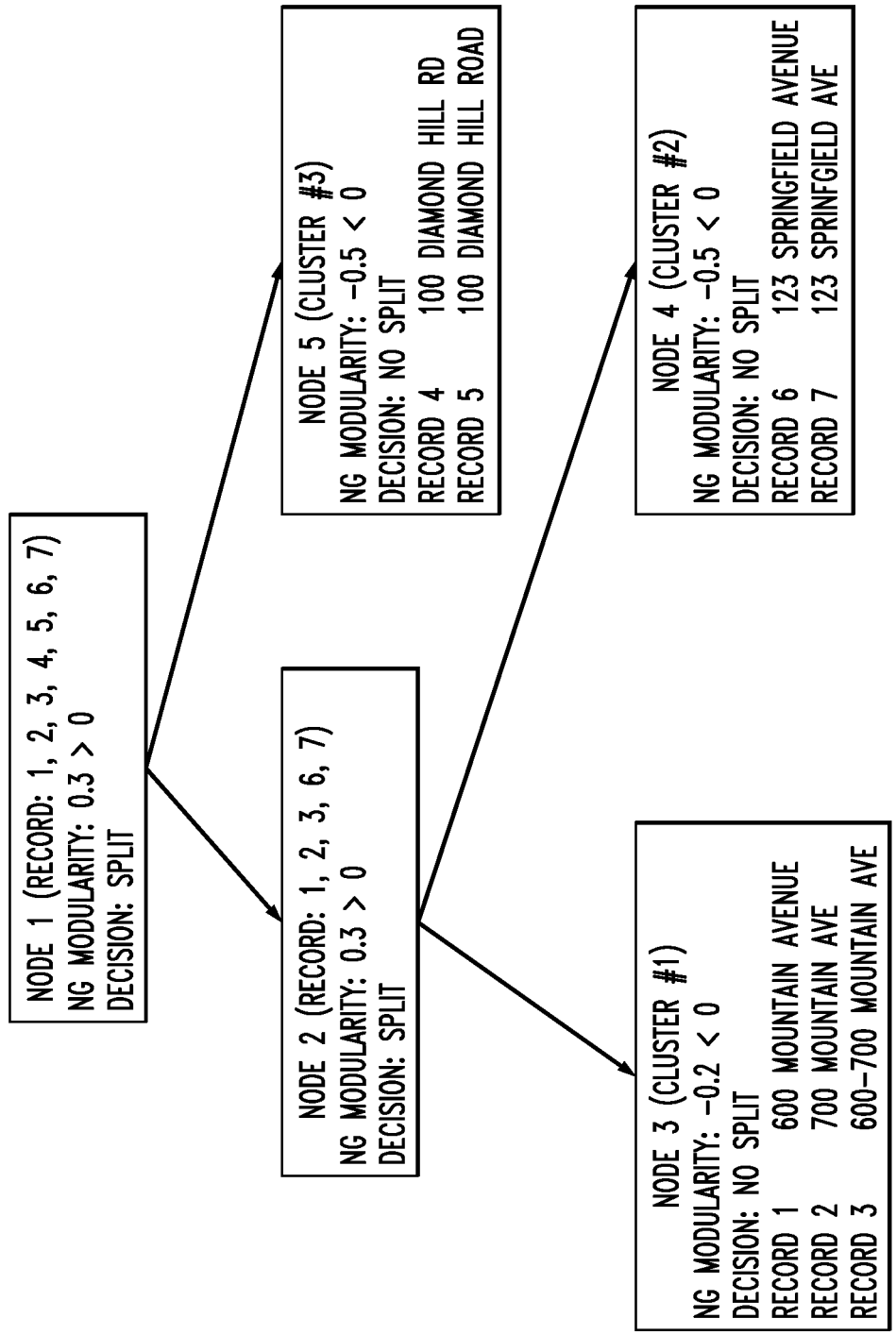

An example of the entity resolution process of FIG. 3 will now be described with reference to FIGS. 4A to 4C. In this simple example, there is a set of seven records as shown in FIG. 4A, each corresponding to an address. FIG. 4B shows a record-record similarity matrix A for the set of seven records. It can be seen that the record-record similarity matrix has dimension 7×7. More generally, in the case of n records, the record-record similarity matrix A is an n×n symmetric matrix, where its (i, j)th entry measures the similarity between the ith and jth records. It is readily apparent that the complexity associated with direct computation of the record-record similarity matrix A is $O(n^2)$. It is a particular advantage of the FIG. 3 process that it does not require direct computation of A. FIG. 4C shows the partitioning of the records of FIG. 4A using the Newman-Girvan (NG) modularity as a splitting criterion in the manner illustrated in FIG. 3. This results in three leaf nodes each including a separate cluster of the original seven records, namely, node 3 including records 1, 2 and 3, node 4 including records 6 and 7, and node 5 including records 4 and 5. Additional details regarding this partitioning example will be provided below.

An example of a blocking approach that requires direct computation of the matrix A will now be described. In this approach, which is based in part on the normalized cut formulation in J. Shi and J. Malik, "Normalized cuts and image segmentation," IEEE Transactions on Pattern Analysis and Machine Intelligence, 22(8):888-905, 2000, a set of n records may be partitioned into K clusters of similar records in the following manner. For $S_1, S_2 \subset \{1,\ldots,n\}$, let $w(S_1,S_2)=\Sigma_{i\in S_1, j\in S_2} A(i, j)$ be the total similarity between records in $S_1$ and $S_2$. The normalized cut criterion defines the partition with K=2 by the following optimization criterion, letting $S=\{1,\ldots,n\}$:

$$Ncut(S_1, S_2) = \frac{w(S_1, S_2)}{w(S_1, S)} + \frac{w(S_1, S_2)}{w(S_2, S)},$$

where $S_1$ and $S_2$ give a binary partition of the n records, i.e. $S_1 \cap S_2$ is empty and $S_1 \cup S_2 = \{1,\ldots,n\}$. The quantity $Ncut(S_1, S_2)$ measures a normalized similarity between records in $S_1$ and $S_2$ and thus minimization of the quantity defines a meaningful partition. This is performed as follows:

1. Rewrite $Ncut(S_1, S_2)$ as a normalized quadratic form of an indicator vector assigning records to $S_1$ and $S_2$.
2. Replace the indicators with real values and solve an equivalent generalized eigenvector problem for the normalized graph Laplacian $\mathcal{L}$ of A defined as follows:

$$\mathcal{L}(A)=D^{-1/2}(D-A)D^{-1/2}=I-D^{-1/2}AD^{-1/2}$$

where $D=diag(A1)$ with 1 being a column vector of 1's. This blocking approach defines a binary partition of the records based on the sign of the entries in the eigenvector that corresponds to the second smallest eigenvalue of $\mathcal{L}(A)$. We will use the term "second smallest eigenvector" to refer to this eigenvector elsewhere herein. When K>2, the above binary partition is implemented recursively to obtain K partitions.

As indicated previously, a problem with this blocking approach and others which require direct computation of the record-record similarity matrix A is that the complexity of the computation increases as the square of n.

The spectral neighborhood blocking technique in one or more of the illustrative embodiments avoids the need for direct computation of the record-record similarity matrix A, and thus exhibits substantially improved computational efficiency, as will now be described in greater detail.

In the present embodiment, we use a vector space model in which each record is represented by a vector of so-called "qgrams." A qgram is a length q substring of the blocking attribute value. Note that each record in the FIG. 4 example is a string and can be decomposed into multiple qgrams. Suppose that m is the total number of qgrams that appear in n records. Let $B_1$ be an n×m matrix, where $B_1(i, j)$ denotes how many times the jth qgram appears in the ith record. The matrix $B_1$ therefore characterizes records by qgrams, which is the above-noted vector space model. Below we define a record-record similarity based on this vector space model.

Given the record-qgram relation matrix $B_1$, let $B_2$ be an n×m matrix defined as follows, for $1 \leq i \leq n, 1 \leq j \leq m$:

$$B_2(i,j)=\log(n/d_j)B_1(i,j)$$

where $$d_j = \sum_{k=1}^{n} B_1(k, j)$$

is the sum of frequencies for the jth qgram over all n records. Note that the matrix $B_2$ is also referred to as a tf-idf weight matrix. See G. Salton et al., "A vector space model for automatic indexing," Communications of the ACM, 18(11):613-620, 1975. The coefficient $\log(n/d_j)$ downgrades the weight for the jth qgram if it appears very often in all records.

Now given the tf-idf weight matrix $B_2$ for the records, we define the similarity matrix A for each pair of the records by the cosine similarity, that is, the similarity between the ith and jth records is:

$$A(i, j) = \frac{\sum_{k=1}^{m} B_2(i, k)B_2(j, k)}{\sqrt{\sum_{k=1}^{m} B_2^2(i, k)} \sqrt{\sum_{k=1}^{m} B_2^2(j, k)}}.$$

Clearly, the larger $A(i, j)$ is, the closer the two records are. This is just one example of a similarity metric, and other metrics may be used to define similarity between two records in other embodiments.

By defining B from $B_2$ as $$B(i,j)=e_i^{-1}B_2(i,j),$$

where $$e_i = \sqrt{\sum_{k=1}^{m} B_2^2(i, k)}$$

is the Euclidean norm of the ith row of $B_2$, we can rewrite A as:

$$A=BB^T,$$

where the superscript $T$ denotes matrix transpose. The matrix B is referred to herein as the normalized record-qgram matrix, and it can be computed with substantially less complexity than that required to compute the record-record similarity matrix A.

It should be noted that in alternative embodiments one can use words instead of qgrams for defining the record-record similarity. However, qgrams are beneficial in that qgrams typically capture more local information than words, which is important when words are noisy. Also, the total number of qgrams can be much smaller than that of words for large scale data sets when q is small and thus are more convenient to manipulate.

As described above, blocking based on the normalized cut formulation reduces to computing the second smallest eigenvector of the Laplacian matrix $\mathcal{L}$ (A). The present embodiment avoids the need to compute A, in the following manner. Given an n×m normalized record-qgram matrix B, let $A=BB^T$ be its corresponding record-record similarity matrix and let $D=\text{diag}(B(B^T 1))$, where diag(•) transforms a vector into a diagonal matrix. Define a matrix C by $C=D^{-1/2}B$. Then the second smallest eigenvector of $\mathcal{L}$ (A) is the second maximum left singular vector of C. This can be seen as follows. Let $C=U\Lambda V^T$ be the singular value decomposition of C, where $\Lambda$ is a diagonal matrix consisting of the singular values. Then we have $\mathcal{L}$ (A)$=I-U\Lambda^2 U$. Therefore, in the present embodiment, we only need to compute the second left singular vector of C, and C can be computed quickly given the typical sparsity of B. This is because the complexity for computing the second maximum left singular vector of a sparse matrix is typically proportional to the number of nonzero entries of the matrix depending on the relative distance between the second and third maximum singular values.

In practice, the singular values of the normalized record-qgram matrices typically decay quickly. Thus, bipartitioning based on the above-described similarity matrix A can be performed quickly as follows:

1. Compute the second maximum singular vector of C, and
2. Assign the n records to one of two subsets according to the signs of the corresponding entries in the singular vector.

This procedure is referred to herein as fast-bipartition for simplicity, and is applied in step 304 of the FIG. 3 process. The total time complexity is O(n) due to the sparsity of B. Given n records, there would be on average O(log n) levels in the bipartition tree.

The Newman-Girvan modularity applied as a stopping criterion in step 306 of the FIG. 3 process will now be described in greater detail. The Newman-Girvan modularity in this embodiment may be defined as follows:

$$Q(S_1, S_2) = \sum_{k=1}^{2} \left( \frac{O_{kk}}{L} - \left(\frac{L_k}{L}\right)^2 \right)$$

where $O_{kk}=\Sigma_{i \in S_k, j \in S_k} A(i, j)$ is the total number of connections among records in $S_k$, $$L_k = \sum_{i \in S_k} d_i \text{ for } k = 1, 2, \text{ and } L = \sum_{i=1}^{n} d_i, \text{ where } d_i = \sum_{j=1}^{n} A(i, j)$$

denotes the degree of the ith record. Note that $L^{-1}O_{kk}$ is simply the observed connectivity density among records in $S_k$, and $(L^{-1}L_k)^2$ is the expectation of the connectivity density when connections are randomly assigned to $$\binom{n}{2}$$

pairs of records based on record degrees.

Therefore, the Newman-Girvan modularity has the following desirable physical interpretation: $Q(S_1, S_2)$ measures the strength of within-clustering connectivity compared with random connections conditional on the record degrees. More specifically, the larger $Q(S_1, S_2)$ is, the stronger the connections are between the records within each of the sets $S_1$ and $S_2$. The Newman-Girvan modularity also has desirable asymptotic properties such as statistical consistency.

It should be noted that the variable L in the Newman-Girvan modularity can be rewritten in terms of B as follows:

$$L = \sum_{i=1}^{n} \sum_{j=1}^{n} A(i, j) = (B^T 1)^T (B^T 1),$$

which can be computed quickly due to the sparsity of B. Similarly, the variables $O_{kk}$ and $L_k$ in the Newman-Girvan modularity can also be computed quickly. Thus the Newman-Girvan modularity for a bipartition of n records can be computed directly based on B with complexity O(n). Furthermore, as mentioned previously, the fast-bipartition procedure takes time O(n). Then we can derive bipartitioning for nodes in each level with complexity O(n). Therefore, the average time complexity of the spectral neighborhood blocking is O(n log n), which is much faster than certain conventional blocking algorithms such as canopy clustering and bigram indexing.

Returning now to the example of FIG. 4, the second smallest eigenvector of the Laplacian matrix $\mathcal{L}$ (A) for the record-record similarity matrix A of FIG. 4B is given by (0.26, 0.24, 0.25, −0.61, −0.61, 0.20, 0.18). Since the fourth and fifth entries of the eigenvector are negative while the others are positive, the seven records will be partitioned into two clusters as (1, 2, 3, 6, 7) and (4, 5). However, such an approach requires direct computation of the matrix A. Using instead the improved approach based on the n×m normalized record-qgram matrix B as described above, each record is first decomposed into 3-grams, which results in 72 qgrams in total, and then the 7×72 record-qgram matrix with tf-idf entries is computed and normalized by rows to obtain the sparse matrix B. The tree is then constructed in the following manner.

To build the first level of the tree, i.e., to bipartition all seven records at the root node, we compute matrix C from B. The signs of the entries in the second left singular vector of C lead to the bipartition (1, 2, 3, 6, 7) and (4, 5). The Newman-Girvan modularity is computed as 0.3, which is positive and thus the tree grows at this node.

Now it is necessary to check each of the two nodes resulting from split of the root node. To bipartition (1, 2, 3, 6, 7), compute C (5×72) based on the submatrix of B which consists of the rows of (1, 2, 3, 6, 7) and its second left singular vector. This gives a bipartition into (1, 2, 3) and (6, 7), and the corresponding Newman-Girvan modularity is computed to be 0.2654, rounded to 0.3 in the figure. As this number is positive, the node is split and the tree grows to level 3. However, a further bipartition of (4, 5) to (4) and (5) is invalid, since the Newman-Girvan modularity is computed to be −0.5, which is negative. The tree is therefore not further split at this node.

Similarly, the third level nodes of the tree, i.e., those associated with respective record sets (1, 2, 3) and (6, 7), are checked. Neither of these nodes can be further bipartitioned because the Newman-Girvan modularities for both of them are negative. So these nodes are not split, and the tree does not grow any further. The final bipartition tree and the complete bipartition process are depicted in FIG. 4C.

The neighborhood search of step 316 is not illustrated in the FIG. 4 example, but is described in greater detail below.

It is a feature of the entity resolution process of FIG. 3 that the neighborhood search performed in step 316 allows a given record to belong to multiple blocks in the result, i.e., there may exist overlapping blocks.

For example, we may regard two leaf nodes as neighbors if they are sufficiently close to each other in the tree, i.e. the path length in terms of the number of edges between them on the tree is small. As a more particular example, path length=4 may be used as the threshold to define the neighbors. For each record i, we examine every other record j in the same leaf or in the neighborhood of i, and determine whether i and j belong to the same block based on a pairwise similarity metric. It is important to point out that the total number of such pairwise examinations is O(n), as the size of a neighborhood is bounded. Therefore, to examine those pairs, one can utilize an even finer similarity metric than the tf-idf metric used in the above-described fast construction of the bipartition tree.

One possible implementation of the neighborhood search applied to the bipartition tree in step 316 is as follows. Let $T_b$, $T_w$ (both in [0,1]) denote two pairwise-distance thresholds where the subscripts b and w stand for between-clusters and within-clusters, respectively. Then the candidate record pairs are generated by performing the following operations for each record $R_i$, $1 \leq i \leq n$:

1. Check every other record $R_j$ that belongs to the same leaf as $R_i$, and if the distance is less than $T_w$, then $R_i$ and $R_j$ belong to the same block.

2. Check each record $R_j$ that belongs to the neighborhood leaves of $R_i$, and if the distance is less than $T_b$, then $R_i$ and $R_j$ belong to the same block.

The performance of this particular neighborhood search is robust to the choices of $T_b$ and that the best performance is achieved when $T_b$ is close to 0 and $T_w$ is close to 1, where the extreme case reduces to simply claiming records in the same leaf as neighbors. The intuition is that two records in the same leaf are either very similar or brought together through a third record, which is similar to both records. The latter case is called transitivity, a property preserved by the nature of spectral clustering.

As indicated above, the average time complexity of the spectral neighborhood blocking in the illustrative embodiments is O(n log n), which is much faster than both canopy clustering and bigram indexing, and in addition exhibits improved robustness to tuning parameters relative to these two conventional blocking approaches. Also, spectral neighborhood blocking overcomes the deficiencies of sorted neighborhood blocking, in that it captures the pairwise similarities between data objects if two similar strings start with different characters. Spectral neighborhood blocking also outperforms sorted neighborhood blocking when data have low or medium noise, which is often the case of real-world applications. The embodiments described above can therefore operate on labeled data, in which the real entities are known for records, as well as unlabelled data, for which the real entities are unknown.

It should also be noted that the spectral neighborhood blocking utilized in the FIG. 3 process is unsupervised, i.e., no training data sets are needed or utilized. Also, it is unconstrained, i.e., it does not require as input the number of blocks or other domain-specific parameters. This makes it readily applicable in many real-world applications in which the number of blocks is unknown beforehand.

Alternative metrics may be used for determining similarity of records in the spectral neighborhood than the ones used in the illustrative embodiments above, and for ranking candidate pairs without training data. Also, alternative modularities may be used in place of the Newman-Girvan modularity applied in the illustrative embodiments.

As indicated previously, embodiments of the present invention may be implemented at least in part in the form of one or more software programs that are stored in a memory or other computer-readable medium of a processing device of an information processing system. System components such as the modules 210, 212 and 214 may be implemented at least in part using software programs. Of course, numerous alternative arrangements of hardware, software or firmware in any combination may be utilized in implementing these and other system elements in accordance with the invention. For example, embodiments of the present invention may be implemented in one or more field-programmable gate arrays (FPGAs), ASICs, digital signal processors or other types of integrated circuit devices, in any combination. Such integrated circuit devices, as well as portions or combinations thereof, are examples of "circuitry" as the latter term is used herein.

It should again be emphasized that the embodiments described above are for purposes of illustration only, and should not be interpreted as limiting in any way. Other embodiments may use different types and arrangements of system components depending on the needs of the particular entity resolution application. Alternative embodiments may therefore utilize the techniques described herein in other contexts in which it is desirable to implement accurate and efficient entity resolution for sets of records or other data objects. Also, it should also be noted that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. An apparatus comprising:
   a processing device comprising a processor having an associated memory;
   wherein the processing device is operative:
      to obtain a plurality of data objects;
      to construct a binary tree using a bipartition procedure in which subsets of the data objects are associated with respective nodes of the tree, wherein evaluation of a designated modularity for a given one of the nodes of the tree is used as a stopping criterion to prevent further partitioning of that node and to indicate designation of that node as a leaf node of the tree, and wherein resulting leaf nodes of the tree provide a non-overlapping partitioning of the plurality of data objects;
      to perform a neighborhood search on the tree to identify pairs of the plurality of data objects that match a same entity based on at least one pairwise similarity metric; and
      to store an indication of said identified pairs of matching data objects in the associated memory; and
   wherein the neighborhood search utilizes a first similarity threshold to compare a pair of data objects that are each associated with a same leaf node of the binary tree and utilizes a second similarity threshold different than the first similarity threshold to compare another pair of data objects that are each respectively associated with a different leaf node of the binary tree.

2. The apparatus of claim 1 wherein the data objects comprise records.

3. The apparatus of claim 2 wherein the bipartition procedure comprises computing a designated singular vector of a matrix C as $C=D^{-1/2}B$, where B denotes an n×m matrix having a corresponding record-record similarity matrix given by $A=BB^T$, where $D=\text{diag}(B(B^T 1))$, and where diag(•) transforms a vector into a diagonal matrix, and further wherein the singular vector of C corresponds to a designated eigenvector of Laplacian matrix $\mathcal{L}(A)$, such that the bipartition procedure is performed without requiring computation of the record-record similarity matrix A.

4. The apparatus of claim 3 wherein the singular vector comprises a second maximum singular vector of the matrix C and corresponds to a second smallest eigenvector of the Laplacian matrix $\mathcal{L}(A)$.

5. The apparatus of claim 3 wherein the bipartition procedure assigns the records associated with the given one of the nodes to one of two subsets according to signs of corresponding entries in the singular vector.

6. The apparatus of claim 1 wherein the designated modularity for the given node comprises a Newman-Girvan modularity.

7. The apparatus of claim 1 wherein each of the data objects in a set of data objects comprises one or more substrings from a set of designated substrings and similarity between pairs of the data objects is determined based on particular numbers of each substring that appear in respective ones of the data objects.

8. The apparatus of claim 1 wherein the associated memory comprises a memory internal to the processing device.

9. The apparatus of claim 1 wherein the processing device comprises an entity resolution module having a tree generation module coupled to a neighborhood search module, the tree generation module comprising a bipartition component and a modularity computation component and being configured for constructing the binary tree.

10. An integrated circuit comprising the apparatus of claim 1.

11. A processor-implemented method comprising:
obtaining a plurality of data objects;
constructing a binary tree using a bipartition procedure in which subsets of the data objects are associated with respective nodes of the tree, wherein evaluation of a designated modularity for a given one of the nodes of the tree is used as a stopping criterion to prevent further partitioning of that node and to indicate designation of that node as a leaf node of the tree, and wherein resulting leaf nodes of the tree provide a non-overlapping partitioning of the plurality of data objects;
performing a neighborhood search on the tree to identify pairs of the plurality of data objects that match a same entity based on at least one pairwise similarity metric; and
storing an indication of said matching pairs of data objects;
wherein the neighborhood search utilizes a first similarity threshold to compare a pair of data objects that are each associated with a same leaf node of the binary tree and utilizes a second similarity threshold different than the first similarity threshold to compare another pair of data objects that are each respectively associated with a different leaf node of the binary tree.

12. The method of claim 11 wherein the data objects comprise records.

13. The method of claim 12 wherein the bipartition procedure comprises computing a designated singular vector of a matrix C as $C=D^{-1/2}B$, where B denotes an n×m matrix having a corresponding record-record similarity matrix given by $A=BB^T$, where $D=\text{diag}(B(B^T 1))$, and where diag(•) transforms a vector into a diagonal matrix, and further wherein the singular vector of C corresponds to a designated eigenvector of Laplacian matrix $\mathcal{L}(A)$, such that the bipartition procedure is performed without requiring computation of the record-record similarity matrix A.

14. The method of claim 13 wherein the singular vector comprises a second maximum singular vector of the matrix C and corresponds to a second smallest eigenvector of the Laplacian matrix $\mathcal{L}(A)$.

15. The method of claim 13 wherein the bipartition procedure assigns the records associated with the given one of the nodes to one of two subsets according to signs of corresponding entries in the singular vector.

16. The method of claim 11 wherein the designated modularity for the given node comprises a Newman-Girvan modularity.

17. The method of claim 11 wherein each of the data objects in a set of data objects comprises one or more substrings from a set of designated substrings and similarity between pairs of the data objects is determined based on particular numbers of each substring that appear in respective ones of the data objects.

18. An article of manufacture comprising a non-transitory computer-readable storage medium having embodied therein executable program code that when executed by a processor of a processing device causes the device to perform the steps of the method of claim 11.

* * * * *